US010496696B2

(12) United States Patent
Qi (10) Patent No.: US 10,496,696 B2
(45) Date of Patent: Dec. 3, 2019

(54) SEARCH METHOD AND APPARATUS (71) Applicant: Baidu Online Network Technology (Beijing) Co., Ltd., Beijing (CN)

(72) Inventor: Hui Qi, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 227 days.

(21) Appl. No.: 15/615,709

(22) Filed: Jun. 6, 2017

(65) Prior Publication Data

US 2018/0107686 A1    Apr. 19, 2018

(30) Foreign Application Priority Data

Oct. 14, 2016    (CN) .......................... 2016 1 0900276

(51) Int. Cl.
*G06F 16/00*    (2019.01)
*G06F 16/583*    (2019.01)
(Continued)

(52) U.S. Cl.
CPC ...... *G06F 16/5838* (2019.01); *G06F 16/5866* (2019.01); *G06F 16/951* (2019.01); *G06K 9/00456* (2013.01)

(58) Field of Classification Search
CPC .............. G06F 16/5838; G06F 16/951; G06F 16/5866; G06K 9/46; G06K 9/00483; G06K 9/00456; G06K 2009/366
See application file for complete search history.

(56) References Cited

U.S. PATENT DOCUMENTS

2009/0119278 A1*    5/2009    Cross ..................... G06F 16/951
2010/0077003 A1*    3/2010    Kondo ................ G06F 16/5838
                                                                            707/780
(Continued)

FOREIGN PATENT DOCUMENTS

CN          103646122          3/2014
JP          2000285141 A       10/2000

OTHER PUBLICATIONS

"How to Quickly and Accurately Find Images with Baidu Google Images," Baidu Experience, Updated Sep. 23, 2012, retrieved from https://jingyan.baidu.com/article/200957617e501fcb0721b4ab. html on Aug. 14, 2018 in 9 pages.

*Primary Examiner* — Alexander Khong
(74) *Attorney, Agent, or Firm* — Knobbe Martens Olson & Bear LLP (57) ABSTRACT

The present disclosure discloses a search method and apparatus. A specific implementation of the method comprises: receiving first information for searching, the first information for searching comprising an image for searching; determining an image attribute tag selected by a selection operation as being second information for searching in response to detecting the selection operation of the preset image attribute tag, the image attribute tag being used for indicating an attribute of the image; sending the received first information for searching and the determined second information for searching to a server, so that the server conducts a search according to the first information for searching and the second information for searching to obtain and send a first image search result; and receiving and displaying the first image search result sent by the server. This implementation improves the search efficiency.

12 Claims, 7 Drawing Sheets

(51) Int. Cl.
*G06F 16/951* (2019.01)
*G06F 16/58* (2019.01)
*G06K 9/00* (2006.01)

(56) References Cited

U.S. PATENT DOCUMENTS

2016/0350332 A1* 12/2016 Cunico ............... G06F 16/5838
2017/0351934 A1* 12/2017 Ruan .................. G06F 17/2765
2018/0060356 A1* 3/2018 Watanabe ......... G06F 16/24578

* cited by examiner

SEARCH METHOD AND APPARATUS

CROSS-REFERENCE TO RELATED APPLICATION

This application is related to and claims the priority from Chinese Application No. 201610900276.4, filed on Oct. 14, 2016, entitled "Search Method and Apparatus," the entire disclosure of which is incorporated herein by reference.

TECHNICAL FIELD

The present disclosure relates to the field of computer technologies, particularly to the field of Internet technologies, and more particularly, to a search method and apparatus.

BACKGROUND

According to the existing search methods, generally image search is conducted according to keywords entered by users and/or images. In the event that the users know nothing about the description of the expected search results, the keywords entered by the users cannot accurately reflect the users' search requirements in most cases. According to another method, servers need to resolve keywords entered by the users for describing the users' search requirements, and then conduct further searches.

The existing search methods cannot directly and accurately convey the users' search requirements to the servers, and the servers have to perform numerous steps of processing the search information entered by the users. Therefore, the existing search methods have a problem of low search efficiency.

SUMMARY

An objective of the present disclosure is to provide an improved search method and apparatus, in order to solve the technical problem mentioned in the foregoing Background section.

In a first aspect, the present disclosure provides a search method. The method comprises: receiving first information for searching, wherein the first information for searching comprises an image for searching; determining an image attribute tag selected by a selection operation as being second information for searching in response to detecting the selection operation of the preset image attribute tag, wherein the image attribute tag is used for indicating an attribute of the image; sending the received first information for searching and the determined second information for searching to a server, so that the server conducts a search according to the first information for searching and the second information for searching to obtain and send a first image search result; and receiving and displaying the first image search result sent by the server.

In a second aspect, the present disclosure provides a search apparatus. The apparatus comprises: a first receiving unit, configured to receive first information for searching, wherein the first information for searching comprises an image for searching; a determining unit, configured to determine an image attribute tag selected by a selection operation as being second information for searching in response to detecting the selection operation of the preset image attribute tag, wherein the image attribute tag is used for indicating an attribute of the image; a first sending unit, configured to send the received first information for searching and the determined second information for searching to a server, so that the server conducts a search according to the first information for searching and the second information for searching to obtain and send a first image search result; and a first display unit, configured to receive and display the first image search result sent by the server.

According to the search method and apparatus provided by the present disclosure, by means of a preset image attribute tag, a user may clearly define an expected search result, thereby saving time spent for describing search requirements for the user; and a server-side may directly identify the image attribute tag to conduct a search, which avoids further resolving and extracting the search requirements of the user, thereby improving the search efficiency.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
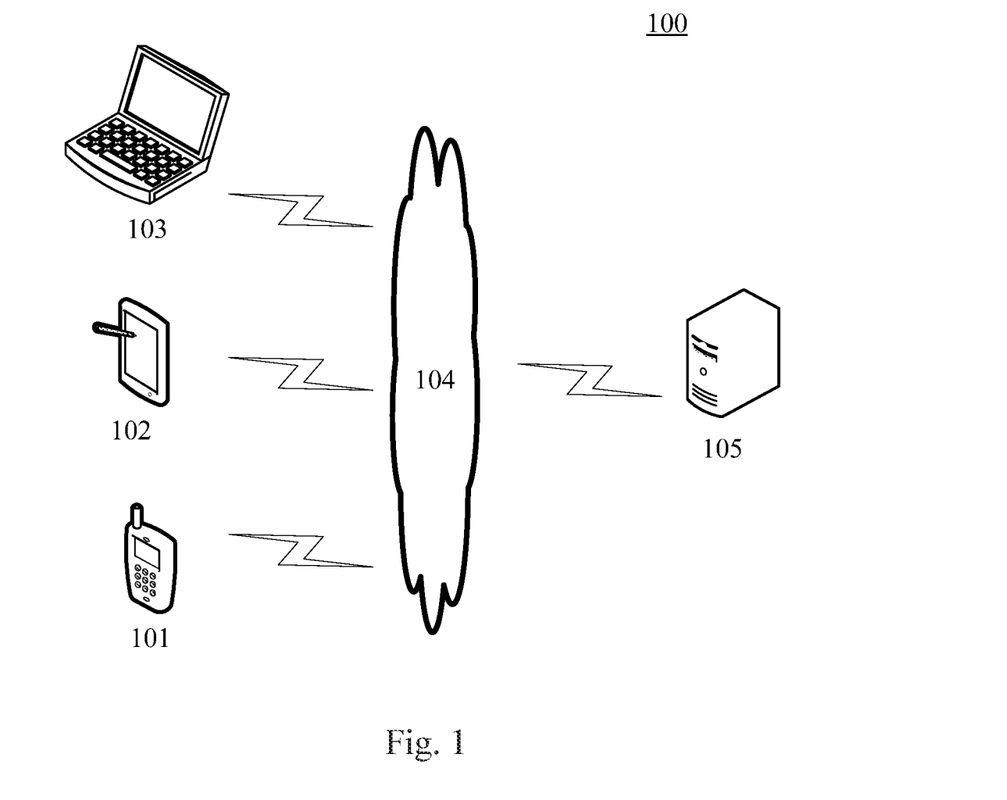
FIG. 1 is an exemplary architecture diagram of a system to which the present disclosure may be applied.

FIG. 1 shows an exemplary architecture of a system 100 which may be used by a searching method and a searching apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as search applications, web browser applications, shopping applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 may be servers providing various services, for example, servers in the backend webpage virtual machine cluster provide support for displaying webpages on the terminal devices 101, 102 or 103. The backend servers may perform a corresponding processing on data according to the received webpage request, and return a processing result (for example, webpage data) to the terminal devices.

It should be noted that the searching method according to the embodiments of the present application are generally performed by the terminal devices 101, 102 or 103. Accordingly, the searching apparatus are generally provided in the terminal devices 101, 102 or 103.

It should be appreciated that the numbers of the terminal devices, the networks and the virtual machines in the virtual machine cluster in FIG. 1 are merely illustrative. Any number of terminal devices, networks and virtual machines may be provided based on the actual requirements.

Figure 2:
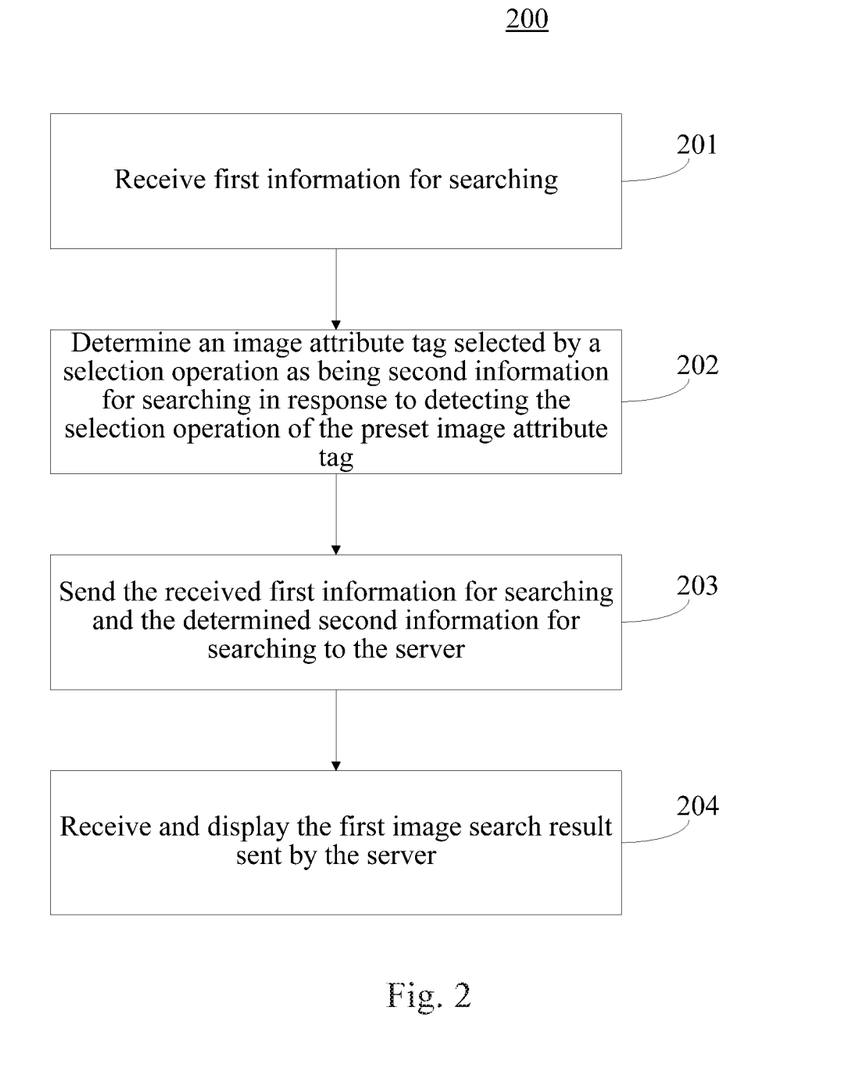
FIG. 2 is a flowchart of a search method according to an embodiment of the present disclosure.

Continuing referring to FIG. 2, which illustrates a flowchart 200 of a search method according to an embodiment of the present disclosure. The search method comprises following steps.

Step 201: receiving first information for searching.

In this embodiment, an electronic device (such as a terminal device as shown in FIG. 1) on which the search method runs may receive, by various means, the first information for searching entered by a user. Herein the first information for searching comprises an image for searching.

Figure 3A:
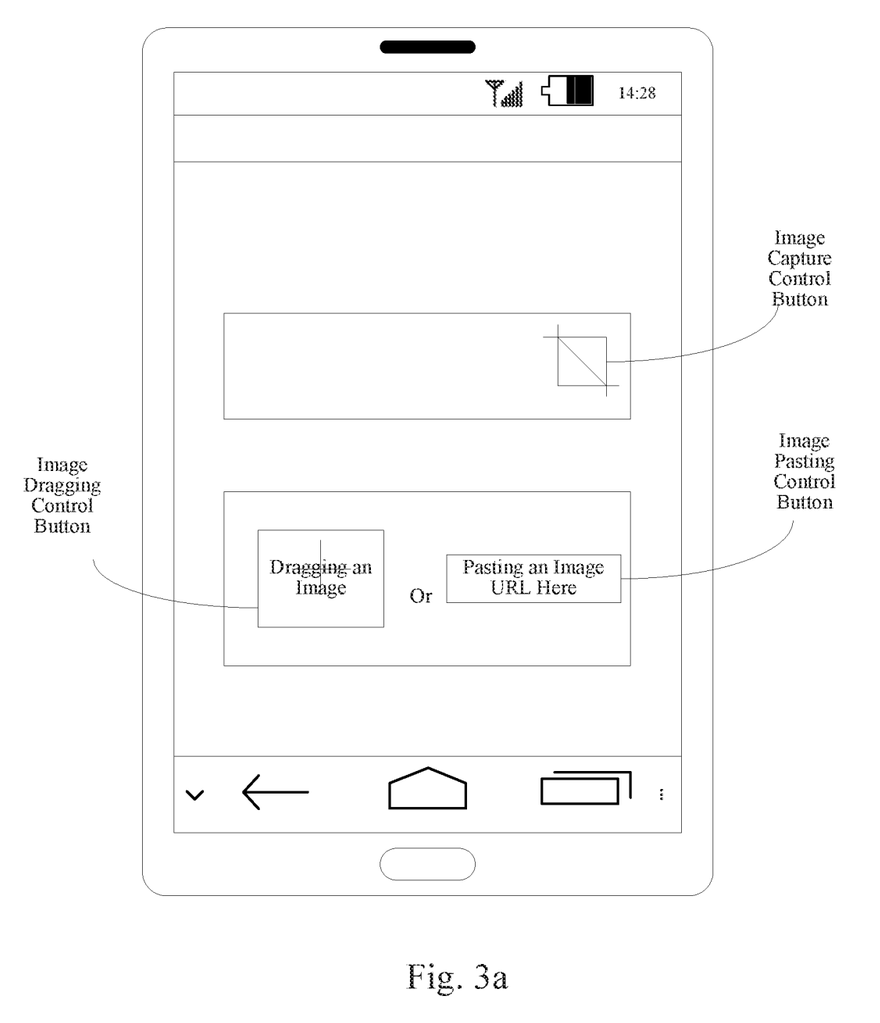
FIG. 3a is a schematic diagram of an application scenario of the search method according to the present disclosure.

In this embodiment, the electronic device may set a plurality of image receiving controls for searching as image search portals. The image receiving control for searching comprises at least one of: an image capture control, an image upload control, an image pasting control and an image dragging control. A button of each control may be provided on the interface of the image search portal. As shown in FIG. 3a, which illustrates the image capture control, the image pasting control and the image dragging control provided on the interface of the search portal. The electronic device starts corresponding image receiving controls in response to button operations of the user.

In some optional implementations of this embodiment, the electronic device may receive the first information for searching by means of a preset image capture control, and a specific implementation thereof is as below: starting an image capture control in response to detecting a click operation of the preset image capture control; detecting an image capture operation of the page in response to starting the image capture control; and determining an image captured by the image capture operation as being the first information for searching in response to ending the image capture operation. Existing image search methods do not support local search of images. However, this implementation may allow a user to conveniently acquire local features of images by means of image capture and initiate a local search of an image, thereby improving the pertinence of the image search method.

In some optional implementations of this embodiment, the first information for searching may be received by means of a preset image upload control, and a specific implementation thereof is as below: starting the image upload control in response to detecting a click operation of the preset image upload control; detecting an image upload operation in response to starting the image upload control, wherein the upload operation may be a URL for receiving an uploaded image or a local storage path of the image; capturing an image indicated by the forgoing image URL or the local storage path of the image; and determining the captured image as being the first information for searching.

In some optional implementations of this embodiment, the first information for searching may be received by means of a preset image pasting control, and a specific implementation thereof is as below: starting the image pasting control in response to detecting a click operation of the preset image pasting control; detecting an image pasting operation in response to starting the image pasting control; receiving the image pasted by the pasting operation; and determining the received image as being the first information for searching.

In some optional implementations of this embodiment, the first information for searching may be received by means of a preset image dragging control, and a specific implementation thereof is as below: starting the image dragging control in response to detecting a dragging operation of an image; receiving, at a preassigned region, the image dragged by the dragging operation in response to a position where the dragging operation is released; and determining the received image as being the first information for searching.

Step 202: determining an image attribute tag selected by a selection operation as being second information for searching in response to detecting the selection operation of the preset image attribute tag.

Figure 3B:
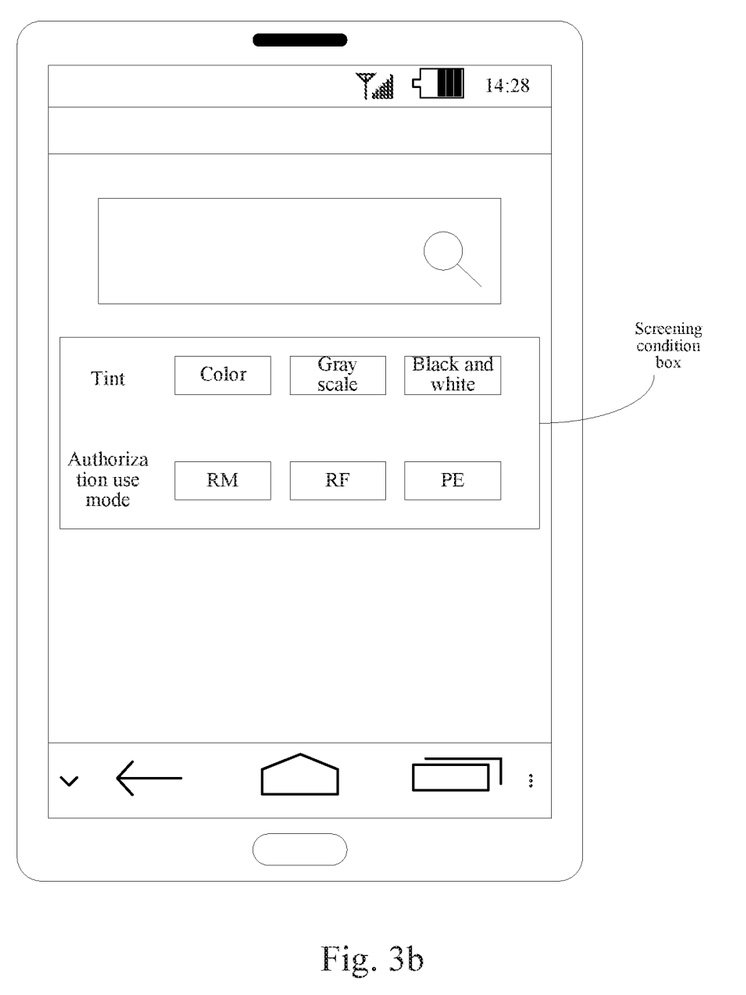
FIG. 3b is a schematic diagram of another application scenario of the search method according to the present disclosure.

In this embodiment, the electronic device may determine the image attribute tag selected by the selection operation as being the second information for searching in response to detecting the selection operation of the preset image attribute tag. Herein, the image attribute tag is used for indicating an attribute of the image. As shown in FIG. 3b, which illustrates an image attribute tag set in a screening condition box. It is to be understood that in the figure a color attribute and an authorization use mode attribute are schematically taken as examples, instead of limiting setting modes and types of the image attribute tag.

As an example, the attribute may be a color attribute, which is used for representing a color accounting for the largest proportion in the image. Correspondingly, the image attribute tag related to the color attribute may comprise tags for indicating colors, for example, a red tag, a yellow tag, and a blue tag, etc.

In some optional implementations of this embodiment, the attribute comprises at least one of: a type attribute, a size attribute, a portrait attribute, a tint attribute and a color attribute. It is to be noted that the attribute tag of the attribute involved in this implementation may be set by a resource provider or may be extracted by resolving, in advance, by a server. As an example, the size attribute of an image may be provided by the resource provider, or may be extracted by resolving, in advance, by the server to determine the size of the image and corresponding size tags.

Herein, the type attribute is used for representing an image type. As an example, the image type may comprise at least one of: photography, illustration and vector. Correspondingly, the image attribute tag related to the type attribute may comprise tags for indicating image types, for example, a photography tag, an illustration tag, and a vector tag, etc.

Herein, the size attribute is used for representing a size of image. As an example, the size of image may comprise various sizes such as 2.2×3.2 (cm) and 13.3×4.8 (cm). Correspondingly, the image attribute tag related to the size attribute may comprise tags in digital form indicating the size attribute, for example, 2.2×3.2 (cm) and 13.3×4.8 (cm). Alternatively, the image attribute tag related to an image attribute also may be tags, smaller or larger by one inch, conducting a literal summary on tags in digital form. Those skilled in the art may understand that being smaller by one inch is the literal summary of the digital form size of 2.2×3.2 (cm), and being larger by one inch is the literal summary of the digital form size of 13.3×4.8 (cm).

Herein, the portrait attribute is used for representing whether an image has a portrait. As an example, whether an image has a portrait may comprise at least one of: somebody or nobody. Correspondingly, the image attribute tag related to the portrait attribute may comprise a somebody tag or a nobody tag.

Herein, the tint attribute comprises colors, gray scale and black and white. As an example, correspondingly, the image attribute tag related to the tint attribute may comprise a color tag, a gray scale tag, and a black-and-white tag.

Herein, the color attribute is used for representing a color accounting for the largest proportion in the image. Correspondingly, the image attribute tag related to the color attribute may comprise tags for indicating colors, for example, a red tag, a yellow tag, and a blue tag, etc.

In some optional implementations of this embodiment, the attribute may further comprise at least one of: an authorization use mode attribute, a use attribute and a resource provider attribute. It is to be noted that the attribute tag of the attribute involved in this implementation may be provided by the resource provider. As an example, the use attribute of an image is set by the resource provider. As far as an image is concerned, whether the use attribute tag of the image is editable or not editable is set by the resource provider.

Herein, the authorization use mode attribute is used for representing an authorization use mode of an image. As an example, the authorization use mode may comprise a royalty-managed (RM) mode, a royalty-free (RF) mode, and a price-easy (PE) mode. Correspondingly, the image attribute tag related to the use attribute may comprise RM, RF and PE.

Herein, the use attribute is used for representing whether an image is editable. Correspondingly, the image attribute tag related to the use attribute may comprise an editable tag and an uneditable tag.

Herein, the resource provider attribute is used for representing a resource provider providing an image. Correspondingly, the image attribute tag related to the resource provider attribute may comprise tags indicating resource providers, for example, resource provider A, resource provider B and resource provider C.

By implementing this step, the user may conveniently provide the second information for searching for conducting an image search. After receiving the normalized second information for searching selected by the user, the server may avoid an operation of extracting a keyword on descriptive information entered by the user. And setting of the image attribute tag ensures that the user's search requirements are consistent with the information for searching of the server, so that the search efficiency is improved.

Step 203: sending the received first information for searching and the determined second information for searching to the server.

In this embodiment, the electronic device may send the first information for searching received in Step 201 and the second information for searching determined in Step 202 to the server. Herein, the server may first conduct a search according to the first information for searching and the second information for searching to obtain a first image search result, and then send the obtained first image search result to the electronic device.

In this embodiment, the server may first calculate the similarity between the first information for searching and the second information for searching and a prestored image using various methods, then sort each image according to a similarity sequence from high to low, and then select a predetermined number of images as the first image search result. An achievable specific algorithm on how to conduct a search using the first information for searching is widely known to those skilled in the art, and thus is not repeated any more herein.

In some optional implementations of this embodiment, the electronic device may conduct a search respectively using the first information for searching and the second information for searching to obtain a result related to the first information for searching and a result related to the second information for searching, and then set different weights for the two results to obtain a comprehensive result, which serves as the first image search result.

In some optional implementations of this embodiment, the electronic device also may first integrate the first information for searching and the second information for searching to obtain overall information for searching, and then conduct a search using the overall information for searching to obtain a first image search result.

In some optional implementations of this embodiment, the server may preset a plurality of image sets according to each image attribute tag, may conduct a search directly in the image set corresponding to the preset image attribute tag when conducting a search according to the image attribute tag, may respectively acquire an image in a set corresponding to each image attribute tag when the second information for searching comprises a plurality of image attribute tags, and then obtain an intersection set of the images acquired from each set to serve as the search result obtained by searching according to the second information for searching.

Step 204: receiving and displaying the first image search result sent by the server.

In this embodiment, the electronic device may first receive the first image search result sent by the server, and then display the received first image search result.

In some optional implementations of this embodiment, the electronic device may conduct further operation on an image in the displayed first image search result, wherein the further operation comprises at least one of: collecting, sharing or downloading. Those skilled in the art may understand that the further operation may also comprise an image capture operation or a copy operation, etc.

In some optional implementations of this embodiment, the electronic device may send an image identification of an image directing at a download operation to the server in response to detecting the download operation of the image, so that the server determines the resource provider of the image indicated by the image identification, and obtains and sends a download link provided by the resource provider;

and receive the download link and display a download page corresponding to the download link. In this implementation, the download page may comprise a payment page.

According to the search method provided by this embodiment, by means of a preset image attribute tag, a user may clearly define an expected search result, thereby saving time spent for describing search requirements for the user; and a server-side may directly identify the image attribute tag to conduct a search, which avoids further resolving and extracting the search requirements of the user, thereby improving the search efficiency.

Figure 4:
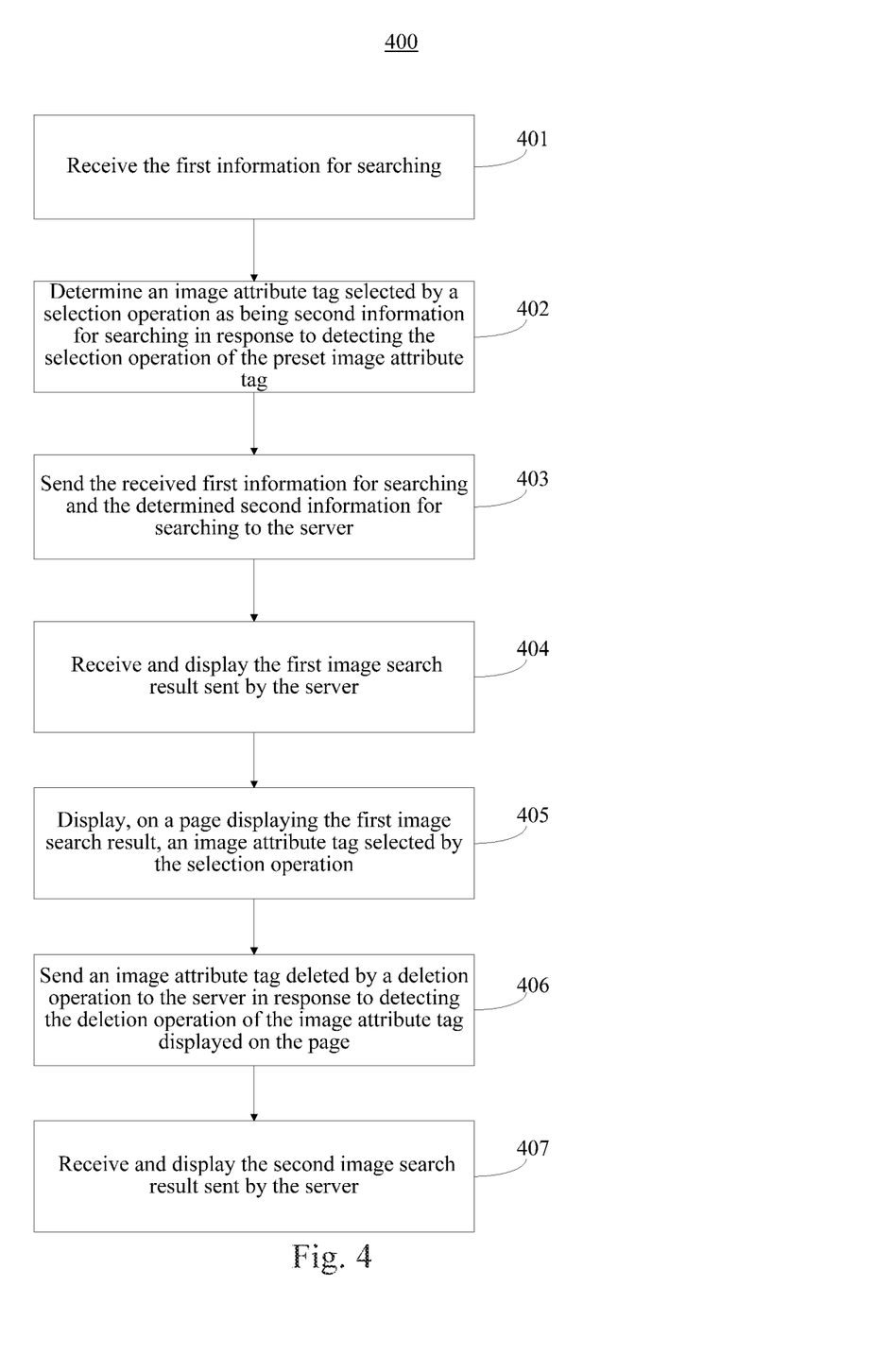
FIG. 4 is a flowchart of the search method according to another embodiment of the present disclosure.

Further referring to FIG. 4, which illustrates a flowchart 400 of the search method according to still another embodiment. The flowchart 400 of the search method comprises following steps.

Step 401: receiving the first information for searching.

In this embodiment, an electronic device (such as a terminal device as shown in FIG. 1) on which the search method runs may receive, by various means, the first information for searching. Herein the first information for searching comprises an image for searching. Specific implementation details of Step 401 may refer to Step 201, which is not repeated anymore herein.

In this embodiment, the first information for searching may further comprise a keyword for searching. Herein, the keyword for searching may be entered by means of a search box serving as a search entry. The keyword for searching may be a description of an image search result expected by the user, for example, red, scenery, and black and white, etc.

Step 402: determining an image attribute tag selected by a selection operation as being second information for searching in response to detecting the selection operation of the preset image attribute tag.

Step 402 corresponds to Step 202. Therefore, specific implementation details of Step 402 may refer to description of Step 202, which is not repeated any more herein.

Step 403: sending the received first information for searching and the determined second information for searching to the server.

In this embodiment, the electronic device may send the first information for searching received in Step 401 and the second information for searching determined in Step 402 to the server. The server may first conduct a search according to the first information for searching and the second information for searching to obtain a first image search result, and then send the obtained first image search result to the electronic device.

In this embodiment, it is to be reminded that the electronic device may send the received keyword for searching to the server, so that the server conducts a search according to the keyword for searching to obtain the first image search result. Of course, herein the server may conduct a search according to one or more of the image for searching, the keyword for searching and the second information for searching to obtain the first image search result. A specific algorithm on how to conduct a search according to the keyword for searching and the image for searching is widely known to those skilled in the art, and thus is not repeated any more herein.

Step 404: receiving and displaying the first image search result sent by the server.

In this embodiment, the electronic device may first receive the first image search result sent by the server, and then display the received first image search result.

Step 405: displaying, on a page displaying the first image search result, an image attribute tag selected by the selection operation.

In this embodiment, the electronic device may display, on the page displaying the first image search result, the image attribute tag selected by the selection operation.

Step 406: sending an image attribute tag deleted by a deletion operation to the server in response to detecting the deletion operation of the image attribute tag displayed on the page.

In this embodiment, the electronic device may send an image attribute tag deleted by a deletion operation to the server after detecting the deletion operation of the image attribute tag displayed on the page.

In some optional implementations of this embodiment, the server may delete, from the first image search result, an image having the image attribute tag deleted by the deletion operation, and determine the first image search result, where partial images have been deleted, as the second image search result.

In some optional implementations of this embodiment, the server may first delete, from the image attribute tag sent in Step 403, the image attribute tag sent in Step 406 to obtain new second information for searching, and then conduct a search according to the first information for searching and the new second information for searching to obtain the second image search result.

Step 407: receiving and displaying the second image search result sent by the server.

In this embodiment, the electronic device may first receive the second image search result sent by the server, and then display the received second image search result.

In some optional implementations of this embodiment, the electronic device also may conduct further operation on an image in the displayed second image search result, wherein the further operation comprises at least one of: collecting, sharing or downloading. Those skilled in the art may understand that the further operation may also comprise an image capture operation or a copy operation, etc.

In some optional implementations of this embodiment, the electronic device may send an image identification of an image directing at a download operation to the server in response to detecting the download operation of the image, so that the server determines the resource provider of the image indicated by the image identification, and obtains and sends a download link provided by the resource provider; and receive the download link and display a download page corresponding to the download link. In this implementation, the download page may comprise a payment page.

As can be seen from FIG. 4, compared with the embodiment corresponding to FIG. 2, the flow 400 of the search method in this embodiment highlights displaying the selected image attribute tag on the page displaying the first search result, and further search may be initiated by deleting the selected image attribute tag. In this way, comprehensive and more effective image search may be implemented.

Figure 5:
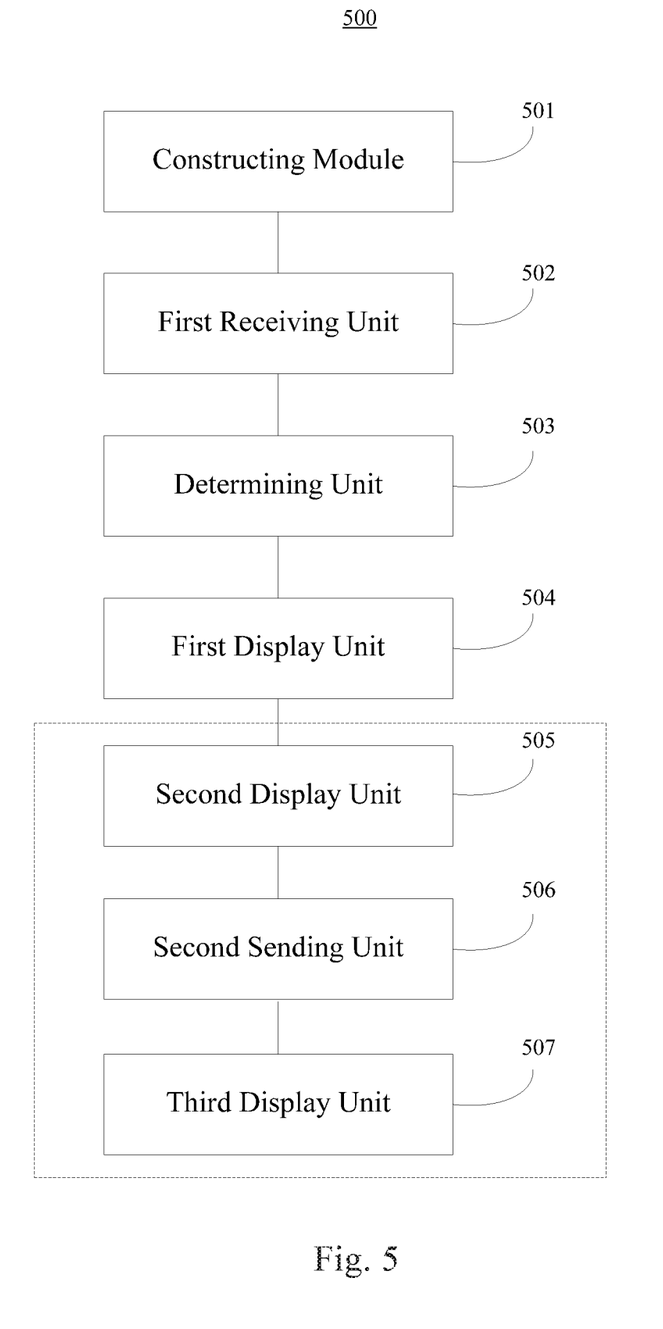
FIG. 5 is a schematic structural diagram of a search apparatus according to an embodiment of the present disclosure.

Further referring to FIG. 5, as an implementation of the method as shown in the foregoing figures, the present disclosure provides an embodiment of a search apparatus. The apparatus embodiment corresponds to the method embodiment as shown in FIG. 2, and the apparatus specifically may be used in various electronic devices.

As shown in FIG. 5, the search apparatus 500 in this embodiment comprises: a first receiving unit 501, a determining unit 502, a first sending unit 503 and a first display unit 504. The first receiving unit 501 is configured to receive first information for searching, wherein the first information for searching includes an image for searching. The determining unit 502 is configured to determine an image attribute tag selected by a selection operation as being second information for searching in response to detecting the selection operation of the preset image attribute tag, wherein the image attribute tag is used for indicating an attribute of the image. The first sending unit 503 is configured to send the received first information for searching and the determined second information for searching to a server, so that the server conducts a search according to the first information for searching and the second information for searching to obtain and send a first image search result. The first display unit 504 is configured to receive and display the first image search result sent by the server.

In this embodiment, the first receiving unit 501 of the search apparatus 500 may receive, by various means, the first information for searching entered by a user. Herein, the first information for searching may comprise an image for searching.

In this embodiment, the determining unit 502 may determine an image attribute tag selected by a selection operation as being second information for searching in response to detecting the selection operation of the preset image attribute tag. Herein, the image attribute tag is used for indicating an attribute of the image.

In this embodiment, the first sending unit 503 may send the first information for searching received by the first receiving unit 501 and the second information for searching determined by the determining unit 502 to the server. The server may first conduct a search according to the first information for searching and the second information for searching to obtain a first image search result, and then send the obtained first image search result to the electronic device.

In this embodiment, the first display unit 504 may first receive the first image search result sent by the server, and then display the received first image search result.

In some optional implementations of this embodiment, the apparatus further comprises: a second display unit 505, configured to display, on a page displaying the first image search result, the image attribute tag selected by the selection operation; a second sending unit 506, configured to send an image attribute tag deleted by a deletion operation to the server in response to detecting the deletion operation of the image attribute tag displayed on the page, so that the server adjusts the first image search result according to the deleted image attribute tag to obtain and send a second image search result; and a third display unit 507, configured to receive and display the second image search result sent by the server.

In some optional implementations of this embodiment, the first receiving module is further configured to: start an image capture control in response to detecting a click operation of the preset image capture control; detect an image capture operation of the page in response to starting the image capture control; and determine an image captured by the image capture operation as being the first information for searching in response to ending the image capture operation.

In some optional implementations of this embodiment, the first information for searching further comprises a keyword for searching; and the first receiving module is further configured to: receive the keyword for searching; and the first sending module is further configured to: send the received keyword for searching to the server, so that the server conducts a search according to the keyword for searching to obtain the first image search result.

In some optional implementations of this embodiment, the attribute comprises at least one of: a type attribute, a size attribute, a portrait attribute, a tint attribute and a color attribute. The type attribute is used for representing a type of the image; the size attribute is used for representing a size of the image; the portrait attribute is used for representing whether the image has a portrait; the tint attribute comprises colors, gray scale and black and white; and the color attribute is used for representing a color accounting for a largest proportion in the image.

In some optional implementations of this embodiment, the attribute comprises at least one of: an authorization use mode attribute, a use attribute and a resource provider attribute. The authorization use mode attribute is used for representing an authorization use mode type of the image, the use attribute is used for representing whether the image is editable, and the resource provider attribute is used for representing a resource provider providing the image.

In some optional implementations of this embodiment, The apparatus further comprises: a further operation module (not shown), configured to conduct further operation on an image in the displayed first image search result or the second image search result, wherein the further operation comprises at least one of: collecting, sharing or downloading.

In some optional implementations of this embodiment, the further operation module is further configured to: send an image identification of an image directing at a download operation to the server in response to detecting the download operation of the image, so that the server determines the resource provider of the image indicated by the image identification, and obtains and sends a download link provided by the resource provider; and receive the download link and display a download page corresponding to the download link.

Specific implementation details and technical effects of the search apparatus as shown in this embodiment may refer to the search method embodiment corresponding to FIG. 2 and FIG. 4, and thus are not repeated any more herein.

Figure 6:
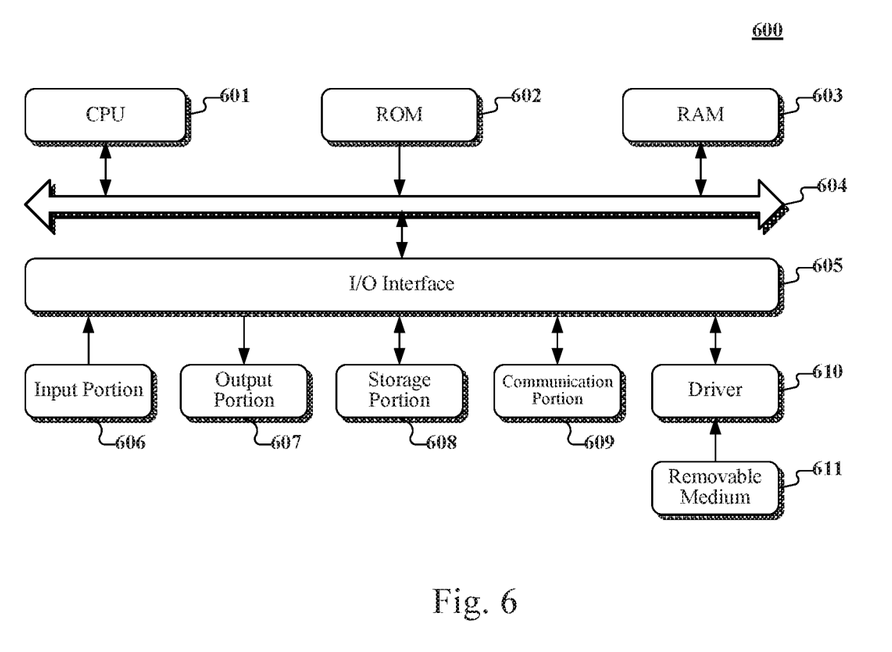
FIG. 6 is a structural schematic diagram of a computer system adapted to implement a terminal device of the embodiments of the present disclosure.

Referring to FIG. 6, a schematic structural diagram of a computer system 600 adapted to implement a terminal device of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a first receiving unit, a determining unit, a first sending unit, and a first display unit, where the names of these units or modules are not considered as a limitation to the units or modules. For example, the first receiving unit may also be described as "a unit for receiving the first information for searching".

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into a terminal. The non-volatile computer storage medium stores one or more programs. The one or more programs, when executed by a device, cause the device to: receive first information for searching, wherein the first information for searching comprises an image for searching; determine an image attribute tag selected by a selection operation as being second information for searching in response to detecting the selection operation of the preset image attribute tag, wherein the image attribute tag is used for indicating an attribute of the image; send the received first information for searching and the determined second information for searching to a server, so that the server conducts a search according to the first information for searching and the second information for searching to obtain and send a first image search result; and receive and display the first image search result sent by the server.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A search method, comprising:
receiving first information for searching, the first information for searching comprising an image for searching;
determining an image attribute tag selected by a selection operation as being second information for searching in response to detecting the selection operation of the preset image attribute tag, the image attribute tag being used for indicating an attribute of the image; wherein the attribute comprises at least one of: an authorization use mode attribute, a use attribute or a resource provider attribute, the authorization use mode attribute being used for representing an authorization use mode type of the image, the use attribute being used for representing whether the image is editable, the resource provider attribute being used for representing a resource provider providing the image;
sending the received first information for searching and the determined second information for searching to a server, so that the server conducts a search according to the first information for searching and the second information for searching to obtain and send a first image search result;
receiving and displaying the first image search result sent by the server;
displaying, on a page displaying the first image search result, the image attribute tag selected by the selection operation;
sending an image attribute tag deleted by a deletion operation to the server in response to detecting the deletion operation of the image attribute tag displayed on the page, so that the server adjusts the first image search result according to the deleted image attribute tag to obtain and send a second image search result; and
receiving and displaying the second image search result sent by the server,
wherein the receiving first information for searching comprises:
starting an image capture control in response to detecting a click operation of a preset image capture control;
detecting an image capture operation of the page in response to starting the image capture control; and
determining an image captured by the image capture operation as being the first information for searching an image matching the captured image in response to ending the image capture operation.

2. The method according to claim 1, wherein the first information for searching further comprises a keyword for searching; and
the receiving first information for searching further comprises:
receiving the keyword for searching; and
the sending the received first information for searching and the determined second information for searching to a server further comprises:

sending the received keyword for searching to the server, so that the server conducts a search according to the keyword for searching to obtain the first image search result.

3. The method according to claim 1, wherein the attribute further comprises at least one of:

a type attribute, a size attribute, a portrait attribute, a tint attribute or a color attribute, the type attribute being used for representing a type of the image, the size attribute being used for representing a size of the image, the portrait attribute being used for representing whether the image has a portrait, the tint attribute comprising colors, gray scale and black and white, and the color attribute being used for representing a color accounting for a largest proportion in the image.

4. The method according to claim 1, further comprising:

conducting a further operation on an image in the displayed first image search result or the second image search result, the further operation comprising at least one of:

collecting, sharing and downloading.

5. The method according to claim 4, further comprising:

sending an image identification of an image directing at a download operation to the server in response to detecting the download operation of the image, so that the server determines the resource provider of the image indicated by the image identification, obtains and sends a download link provided by the resource provider; and receiving the download link and displaying a download page corresponding to the download link.

6. A search apparatus, comprising:

at least one processor; and a memory storing instructions, which when executed by the at least one processor, cause the at least one processor to perform operations, the operations comprising:

receiving first information for searching, the first information for searching comprising an image for searching;

determining an image attribute tag selected by a selection operation as being second information for searching in response to detecting the selection operation of the preset image attribute tag, the image attribute tag being used for indicating an attribute of the image; wherein the attribute comprises at least one of: an authorization use mode attribute, a use attribute or a resource provider attribute, the authorization use mode attribute being used for representing an authorization use mode type of the image, the use attribute being used for representing whether the image is editable, the resource provider attribute being used for representing a resource provider providing the image;

sending the received first information for searching and the determined second information for searching to a server, so that the server conducts a search according to the first information for searching and the second information for searching to obtain and send a first image search result;

receiving and display the first image search result sent by the server;

displaying, on a page displaying the first image search result, the image attribute tag selected by the selection operation;

sending an image attribute tag deleted by a deletion operation to the server in response to detecting the deletion operation of the image attribute tag displayed on the page, so that the server adjusts the first image search result according to the deleted image attribute tag to obtain and send a second image search result; and receiving and display the second image search result sent by the server, wherein the receiving first information for searching further comprises:

starting an image capture control in response to detecting a click operation of a preset image capture control;

detecting an image capture operation of the page in response to starting the image capture control; and determining an image captured by the image capture operation as being the first information for searching an image matching the captured image in response to ending the image capture operation.

7. The apparatus according to claim 6, wherein the first information for searching further comprises a keyword for searching; and the receiving first information for searching further comprises:

receiving the keyword for searching; and the sending the received first information for searching and the determined second information for searching to a server further comprises:

sending the received keyword for searching to the server, so that the server conducts a search according to the keyword for searching to obtain the first image search result.

8. The apparatus according to claim 6, wherein the attribute further comprises at least one of:

a type attribute, a size attribute, a portrait attribute, a tint attribute or a color attribute, the type attribute being used for representing a type of the image, the size attribute being used for representing a size of the image, the portrait attribute being used for representing whether the image has a portrait, the tint attribute comprising colors, gray scale and black and white, and the color attribute being used for representing a color accounting for a largest proportion in the image.

9. The apparatus according to claim 6, the operations further comprising:

conducting a further operation on an image in the displayed first image search result or the second image search result, the further operation comprising at least one of:

collecting, sharing and downloading.

10. The apparatus according to claim 9, the operations further comprising:

sending an image identification of an image directing at a download operation to the server in response to detecting the download operation of the image, so that the server determines the resource provider of the image indicated by the image identification, obtains and sends a download link provided by the resource provider; and receiving the download link and display a download page corresponding to the download link.

11. A non-transitory computer storage medium storing a computer program, which when executed by one or more processors, cause the one or more processors to perform operations, the operations comprising:

receiving first information for searching, the first information for searching comprising an image for searching;

determining an image attribute tag selected by a selection operation as being second information for searching in response to detecting the selection operation of the preset image attribute tag, the image attribute tag being used for indicating an attribute of the image; wherein the attribute comprises at least one of: an authorization use mode attribute, a use attribute or a resource provider attribute, the authorization use mode attribute being used for representing an authorization use mode type of the image, the use attribute being used for representing whether the image is editable, the resource provider attribute being used for representing a resource provider providing the image;

sending the received first information for searching and the determined second information for searching to a server, so that the server conducts a search according to the first information for searching and the second information for searching to obtain and send a first image search result;

receiving and displaying the first image search result sent by the server;

displaying, on a page displaying the first image search result, the image attribute tag selected by the selection operation;

sending an image attribute tag deleted by a deletion operation to the server in response to detecting the deletion operation of the image attribute tag displayed on the page, so that the server adjusts the first image search result according to the deleted image attribute tag to obtain and send a second image search result; and receiving and displaying the second image search result sent by the server, wherein the receiving first information for searching comprises:
   starting an image capture control in response to detecting a click operation of a preset image capture control;
   detecting an image capture operation of the page in response to starting the image capture control; and
   determining an image captured by the image capture operation as being the first information for searching an image matching the captured image in response to ending the image capture operation.

12. The non-transitory computer storage medium according to claim 11, wherein the first information for searching further comprises a keyword for searching; and the receiving first information for searching further comprises:
receiving the keyword for searching; and
the sending the received first information for searching and the determined second information for searching to a server further comprises:
sending the received keyword for searching to the server, so that the server conducts a search according to the keyword for searching to obtain the first image search result.

* * * * *